(12) United States Patent
Kim et al.

(10) Patent No.: US 10,170,779 B2
(45) Date of Patent: Jan. 1, 2019

(54) HUMIDIFIER FOR FUEL CELL

(71) Applicants: HYUNDAI MOTOR COMPANY, Seoul (KR); KIA MOTORS CORPORATION, Seoul (KR)

(72) Inventors: Hyunyoo Kim, Seoul (KR); Chang Ha Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/364,900

(22) Filed: Nov. 30, 2016

(65) Prior Publication Data

US 2018/0062187 A1 Mar. 1, 2018

(30) Foreign Application Priority Data

Aug. 31, 2016 (KR) .......................... 10-2016-0112136

(51) Int. Cl.
*H01M 8/00* (2016.01)
*H01M 8/04119* (2016.01)

(52) U.S. Cl.
CPC ... *H01M 8/04149* (2013.01); *H01M 8/04164* (2013.01)

(58) Field of Classification Search
CPC .. Y02E 60/50; Y02E 60/521; H01M 8/04291; H01M 8/04119
See application file for complete search history.

(56) References Cited

U.S. PATENT DOCUMENTS

| | | | |
|---|---|---|---|
| 2,663,500 A * | 12/1953 | Holtzclaw | F24F 6/12 137/505 |
| 7,838,160 B2 | 11/2010 | Suzuki et al. | |
| 2002/0039674 A1* | 4/2002 | Suzuki | H01M 8/04119 429/414 |
| 2016/0036073 A1* | 2/2016 | Kim | H01M 8/04291 429/414 |

FOREIGN PATENT DOCUMENTS

| | | |
|---|---|---|
| JP | 2001-202978 A | 7/2001 |
| JP | 2005337539 A | 12/2005 |
| JP | 2008-121910 A | 5/2008 |
| JP | 4109667 B2 | 7/2008 |
| JP | 2012-134067 A | 7/2012 |
| JP | 2014-191866 A | 10/2014 |
| KR | 10-2012-0053103 A | 5/2012 |
| KR | 10-1592423 B1 | 2/2016 |

* cited by examiner

*Primary Examiner* — Cynthia H Kelly
*Assistant Examiner* — Monique M Wills
(74) *Attorney, Agent, or Firm* — McDermott Will & Emery LLP

(57) ABSTRACT

A humidifier for a fuel cell includes a membrane module which accommodates therein a humidifying membrane, a first cap unit coupled to one side of the membrane module and supplies supply air to the membrane module, a second cap unit coupled to another side of the membrane module and discharges humidified air introduced from the membrane module, and a bypass tube provided in the second cap unit and bypasses condensate water introduced into the second cap unit to the membrane module.

19 Claims, 11 Drawing Sheets

HUMIDIFIER FOR FUEL CELL

CROSS-REFERENCE TO RELATED APPLICATION

This application claims the benefit of priority to Korean Patent Application No. 10-2016-0112136, filed in the Korean Intellectual Property Office on Aug. 31, 2016, the entire contents of which are incorporated herein by reference.

TECHNICAL FIELD

An exemplary embodiment of the present disclosure relates to a fuel cell system for a fuel cell vehicle, and more particularly, to a humidifier for a fuel cell which humidifies a reactant gas to be supplied to the fuel cell.

BACKGROUND

In general, a fuel cell system is a type of electric power generation system which generates electrical energy through an electrochemical reaction between hydrogen and oxygen (oxygen included in air) by a fuel cell. For example, the fuel cell system may be applied to a fuel cell vehicle and may drive the vehicle by operating an electric motor.

The fuel cell system includes a stack which is an electricity generating assembly configured by unit fuel cells each having an air electrode and a fuel electrode, an air supply device which supplies air to the air electrode of the fuel cell, and a hydrogen supply device which supplies hydrogen to the fuel electrode of the fuel cell.

Meanwhile, in the case of a polymer fuel cell, an appropriate amount of moisture is required to allow an ion exchange membrane of a membrane-electrode assembly (MEA) to smoothly perform functions thereof, and to this end, the air supply device of the fuel cell system includes a humidifier for humidifying air to be supplied to the fuel cell.

The humidifier humidifies dry air, which is supplied by an air compressor of the air supply device, by using moisture in hot and humid air discharged from the air electrode of the fuel cell, and supplies the humidified air to the air electrode of the fuel cell.

As the fuel cell vehicle may have limitations with respect to packaging, a membrane humidification method, which requires a relatively small volume, is applied. The humidifier according to the membrane humidification method has an advantage in that no particular power is required, as well as an advantage in respect to packaging.

The humidifier according to the membrane humidification method performs the membrane humidification through a gas-to-gas moisture exchange method between hot and humid discharge gas discharged from the air electrode of the fuel cell and dry air supplied by the air compressor.

Meanwhile, water produced in the stack clogs a part of, or the entire, air flow path (a stack manifold, an inlet and an outlet of the cell, respective channels in the cell, or the like) of the stack, and thus hinders the supply of the reactant gas, which may cause a deterioration in performance of the stack and a problem with durability of the stack.

Therefore, the humidifier is typically positioned at a lower end of the stack in view of a layout of the fuel cell system. In this case, water condensed in the stack mostly flows by gravity toward the humidifier positioned adjacent to the stack.

In addition, moisture vapor is condensed due to a temperature difference from outside air when the air humidified by the humidifier is supplied to the stack, the condensate water flows by gravity into the humidifier when a flow velocity of the air is low, the moisture vapor is condensed after shutdown, and the condensate water flows into the humidifier from the stack or pipes.

However, because a flow velocity of air to be supplied from the humidifier to the stack is increased when the fuel cell system rapidly outputs power or outputs high power in an idle state of the fuel cell vehicle, the condensate water stagnating in the humidifier flows into the stack and thus closes the flow paths in the stack, which may cause a phenomenon in which the cell is withdrawn from the stack.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a humidifier for a fuel cell which has a simple structure and may prevent condensate water from stagnating and flowing into a stack.

An exemplary embodiment of the present disclosure provides a humidifier for a fuel cell, the humidifier including: i) a membrane module which accommodates therein a humidifying membrane; ii) a first cap unit which is coupled to one side of the membrane module and supplies supply air to the membrane module; iii) a second cap unit which is coupled to another side of the membrane module and discharges humidified air introduced from the membrane module; and iv) a bypass tube which is provided in the second cap unit and bypasses condensate water introduced into the second cap unit to the membrane module.

In addition, in the humidifier for a fuel cell according to the exemplary embodiment of the present disclosure, the membrane module may include support members, as potting portions, which support both ends of the humidifying membrane.

In addition, in the humidifier for a fuel cell according to the exemplary embodiment of the present disclosure, the bypass tube may be provided in the second cap unit, and may bypass-connect an interior of the second cap unit and an interior of the membrane module through the support member.

Another exemplary embodiment of the present disclosure provides a humidifier for a fuel cell, the humidifier including: i) a membrane module which accommodates therein a humidifying membrane; ii) a first cap unit which is coupled to one side of the membrane module and supplies supply air to the membrane module; iii) a second cap unit which is coupled to another side of the membrane module and discharges humidified air introduced from the membrane module; and iv) a bypass tube which is provided integrally on an inner wall surface of the second cap unit, and bypass-connects the second cap unit and the membrane module.

In addition, in the humidifier for a fuel cell according to the exemplary embodiment of the present disclosure, the bypass tube may bypass moisture, which is introduced into the second cap unit from the membrane module, to the membrane module by a pressure difference between the membrane module and the second cap unit.

In addition, in the humidifier for a fuel cell according to the exemplary embodiment of the present disclosure, the bypass tube may be integrally injection molded on the inner wall surface of the second cap unit which corresponds to the membrane module.

In addition, in the humidifier for a fuel cell according to the exemplary embodiment of the present disclosure, the bypass tube may include: a first tube which has an inlet formed at a lower end thereof, is disposed on the inner wall surface of the second cap unit in a vertical direction, and is integrally connected to the inner wall surface of the second cap unit; and a second tube which is integrally connected to an upper end of the first tube, has an outlet connected with the membrane module, and is disposed on the upper end of the first tube so as to be directed toward the membrane module.

In addition, in the humidifier for a fuel cell according to the exemplary embodiment of the present disclosure, the bypass tube may include at least one third tube which branches off from the first tube in a horizontal direction, extends in the vertical direction from the direction in which the third tube branches off, has another inlet formed at a lower end thereof, and is integrally connected to the inner wall surface of the second cap unit.

In addition, in the humidifier for a fuel cell according to the exemplary embodiment of the present disclosure, the bypass tube may include a metal pipe which is formed by insert injection molding on the inner wall surface of the second cap unit which corresponds to the membrane module.

In addition, in the humidifier for a fuel cell according to the exemplary embodiment of the present disclosure, the metal pipe may be fixed to a fixing member integrally formed on the inner wall surface of the second cap unit.

In addition, in the humidifier for a fuel cell according to the exemplary embodiment of the present disclosure, the metal pipe may include: a first tube which has an inlet formed at a lower end thereof and is fixed to the fixing member in the vertical direction, and a second tube which is integrally connected to an upper end of the first tube, has an outlet connected with the membrane module, and is fixed to the fixing member so as to be directed toward the membrane module.

In addition, in the humidifier for a fuel cell according to the exemplary embodiment of the present disclosure, the metal pipe may include at least one third tube which branches off from the first tube in the horizontal direction, is fixed to the fixing member so as to extend in the vertical direction from the direction in which the third tube branches off, and has another inlet formed at a lower end thereof.

In addition, in the humidifier for a fuel cell according to the exemplary embodiment of the present disclosure, the bypass tube may be provided such that a cross-sectional area of the inlet of the first tube is relatively larger than a cross-sectional area of the outlet of the second tube.

In addition, in the humidifier for a fuel cell according to the exemplary embodiment of the present disclosure, the bypass tube may be provided such that a cross section of the inlet of the first tube is diagonally formed toward the membrane module.

In addition, in the humidifier for a fuel cell according to the exemplary embodiment of the present disclosure, the second cap unit may have an air discharge port through which the humidified air introduced from the membrane module is discharged to a stack.

In addition, in the humidifier for a fuel cell according to the exemplary embodiment of the present disclosure, the air discharge port may be formed in an upper surface of the second cap unit so as to correspond to the second tube.

In addition, in the humidifier for a fuel cell according to the exemplary embodiment of the present disclosure, the air discharge port may be formed in a side surface of the second cap unit so as to correspond to the second tube.

In addition, in the humidifier for a fuel cell according to the exemplary embodiment of the present disclosure, the bypass tube may be provided integrally on the inner wall surface at the other side of the second cap unit.

In addition, in the humidifier for a fuel cell according to the exemplary embodiment of the present disclosure, the inlet of the first tube may be disposed in a direction different from an air flow direction in the second cap unit.

In addition, in the humidifier for a fuel cell according to the exemplary embodiment of the present disclosure, the bypass tube may include: a first tube which is disposed on the inner wall surface of the second cap unit so as to extend from the vertical direction to the horizontal direction, has an inlet formed in a direction different from an air flow direction in the second cap unit, and is integrally connected to the inner wall surface of the second cap unit; and a second tube which is integrally connected to an upper end of the first tube, has an outlet connected with the membrane module, and is disposed on the upper end of the first tube so as to be directed toward the membrane module.

In addition, in the humidifier for a fuel cell according to the exemplary embodiment of the present disclosure, the second cap unit may include a duct unit which is integrally formed on the inner wall surface which corresponds to the membrane module, has a plurality of inlets formed at a lower end thereof, gradually decreases in width upward, and is connected with the bypass tube.

In addition, in the humidifier for a fuel cell according to the exemplary embodiment of the present disclosure, the bypass tube may include: a first tube which is disposed on the inner wall surface of the second cap unit in the vertical direction, is connected with an upper portion of the duct unit, and is integrally formed on the inner wall surface of the second cap unit; and a second tube which is integrally connected to an upper end of the first tube, has an outlet connected with the membrane module, and is disposed on the upper end of the first tube so as to be directed toward the membrane module.

In addition, in the humidifier for a fuel cell according to the exemplary embodiment of the present disclosure, the bypass tube may bypass-connect an interior of the second cap unit and an interior of the membrane module through the support member when the second cap unit is assembled to the membrane module.

According to the exemplary embodiments of the present disclosure, the bypass tube is configured integrally on the inner wall surface of the second cap unit, such that the condensate water introduced into the second cap unit is bypassed to the membrane module through the bypass tube, and as a result, it is possible to prevent the condensate water from stagnating in the humidifier and to prevent the condensate water from flowing into the fuel cell stack.

Therefore, according to the exemplary embodiment of the present disclosure, it is possible to prevent the cell from being withdrawn due to the flow of the condensate water into the fuel cell stack, and thus to improve operational stability of the fuel cell system.

Furthermore, in the exemplary embodiment of the present disclosure, since the bypass tube is configured integrally on the inner wall surface of the second cap unit by injection molding, the membrane module and the second cap unit may be bypass-connected through the bypass tube only by fastening the membrane module and the second cap unit, and as a result, it is possible to achieve convenience when assembling the humidifier.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

Figure 1:
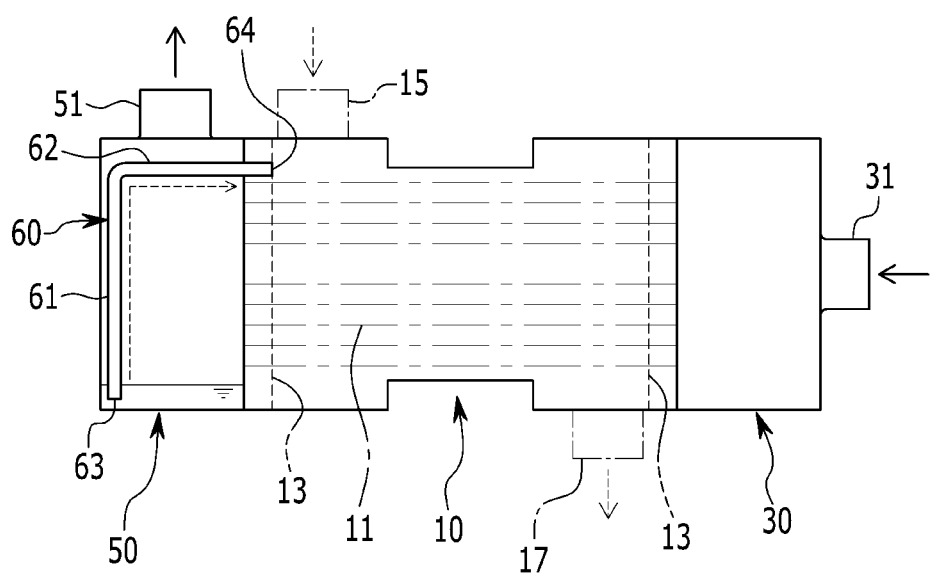
FIG. 1 is a view schematically illustrating a humidifier for a fuel cell according to exemplary embodiments of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

A part irrelevant to the description will be omitted to clearly describe the present disclosure, and the same or similar constituent elements will be designated by the same reference numerals throughout the specification.

The size and thickness of each component illustrated in the drawings are merely shown for understanding and ease of description, but the present disclosure is not limited thereto. Thicknesses of several portions and regions may be enlarged for clearly describing the above.

In addition, in the following description, names of constituent elements are classified as a first . . . , a second . . . , and the like so as to discriminate the constituent elements having the same name, and the names are not essentially limited to the order in the description below.

Unless otherwise described, throughout the specification, the word "comprise" and variations such as "comprises" or "comprising" will be understood to imply the inclusion of stated elements, not the exclusion of any other elements.

In addition, the term "unit", "means", "part", "member", or the like, which is described in the specification, means a unit of a comprehensive configuration that performs at least one function or operation.

FIG. 1 is a view schematically illustrating a humidifier for a fuel cell according to exemplary embodiments of the present disclosure.

Referring to FIG. 1, a humidifier 100 for a fuel cell according to exemplary embodiments of the present disclosure may be applied to a fuel cell system which generates electrical energy through an electrochemical reaction between fuel, which is hydrogen, and air which is an oxidizing agent. For example, the fuel cell system may be applied to a fuel cell vehicle and may drive the vehicle by operating an electric motor.

The humidifier 100 for a fuel cell according to exemplary embodiments of the present disclosure performs the membrane humidification of discharge air discharged from a fuel cell stack and supply air supplied from an air compressor, and supplies the humidified air (hereinafter, referred to as "humidified air" for convenience) to the fuel cell stack. The humidifier 100 for a fuel cell includes a membrane module 10, a first cap unit 30 and a second cap unit 50.

The membrane module 10 is also called "shell-in" in the art, and has humidifying membranes 11 which are several bundles of hollow fiber membranes and are concentrated in the membrane module 10, and the humidifying membranes 11 are embedded in a cylindrical housing. The membrane module 10 includes support members 13 (also called "potting portion" in the art) which support both ends of the humidifying membranes 11. For example, the support members 13 are made of a polymeric material, and support both end portions of the humidifying membranes 11 in a state in which the support members 13 are fixed to both ends of the housing.

Here, the membrane module 10 is formed with a discharge air inlet portion 15 through which the discharge air discharged from the fuel cell stack is injected into the housing, and a discharge air outlet portion 17 through which the discharge air from which moisture has been removed is discharged to an exhaust system.

The first cap unit 30 is also called "cap-in" in the art, and serves to inject the supply air supplied by the air compressor into the membrane module 10. The first cap unit 30 is coupled to one end portion of the membrane module 10. The first cap unit 30 is formed with a supply air injection port 31 through which the supply air is supplied into the membrane module 10.

Further, the second cap unit 50 is also called "cap-out" in the art, and serves to discharge the humidified air introduced from the membrane module 10 to the fuel cell stack. The second cap unit 50 is coupled to the other end portion of the membrane module 10, and formed with an air discharge port 51 through which the humidified air is discharged to the fuel cell stack.

Meanwhile, in the humidifier 100 for a fuel cell, which is configured as described above, condensate water flows into the second cap unit 50, and the condensate water may flow into the fuel cell stack together with the humidified air.

For example, when the fuel cell system rapidly outputs power or outputs high power in an idle state (at a low flow rate) of the vehicle, a large amount of the moisture-containing humidified air in the humidifying membrane 11 is discharged to the second cap unit 50, and the condensate water condensed in the second cap unit 50 is supplied to the fuel cell stack through the air discharge port 51, and as a result, the cell may be withdrawn due to the flow of the condensate water into the fuel cell stack.

The humidifier 100 for a fuel cell according to exemplary embodiments of the present disclosure has a structure in which a part of the moisture-containing air, which is introduced into the second cap unit 50 from the membrane module 10, is bypassed to the membrane module 10, and the condensate water stagnating in the second cap unit 50 is discharged through the discharge air outlet portion 17 of the membrane module 10.

That is, exemplary embodiments of the present disclosure provide the humidifier 100 for a fuel cell which may bypass the condensate water introduced into the second cap unit 50 to the membrane module 10, thereby preventing the condensate water from stagnating and preventing the condensate water from flowing into the fuel cell stack.

To this end, the humidifier 100 for a fuel cell according to exemplary embodiments of the present disclosure includes a bypass tube 60 which bypasses the condensate water introduced into the second cap unit 50 to the membrane module 10.

In exemplary embodiments of the present disclosure, the bypass tube 60 bypass-connects the interior of the second cap unit 50 and the interior of the membrane module 10, and the bypass tube 60 is provided in the second cap unit 50. Moreover, the bypass tube 60 is provided in the second cap unit 50, and bypass-connects the interior of the second cap unit 50 and the interior of the membrane module 10 through the aforementioned support member 13.

Furthermore, in exemplary embodiments of the present disclosure, the bypass tube 60 is provided integrally with an inner wall surface of the second cap unit 50, and may bypass-connect the interior of the second cap unit 50 and the interior of the membrane module 10 through the support member 13 when the second cap unit 50 is assembled to the membrane module 10.

Here, the bypass tube 60 bypasses a part of the moisture-containing air, which is introduced into the second cap unit 50 from the membrane module 10, to the membrane module 10 by using a pressure difference between the membrane module 10 and the second cap unit 50, and may discharge the condensate water stagnating in the second cap unit 50 through the discharge air outlet portion 17 of the membrane module 10.

Figure 2A:
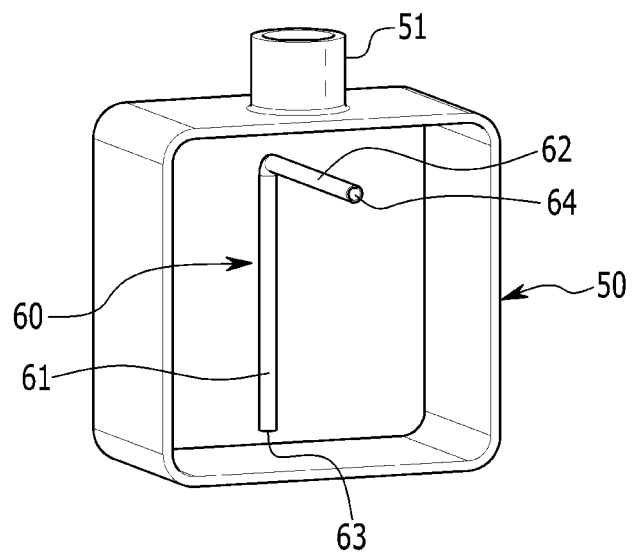
FIGS. 2a and 2b are views illustrating a bypass tube applied to a humidifier for a fuel cell according to exemplary embodiments of the present disclosure.
Figure 2B:
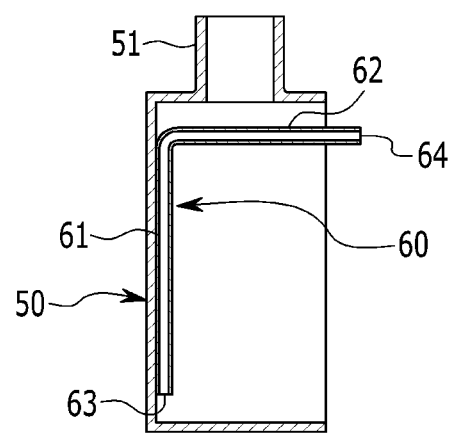

FIGS. 2a and 2b are views illustrating a bypass tube applied to a humidifier for a fuel cell according to exemplary embodiments of the present disclosure.

Referring to FIGS. 1 and 2, the bypass tube 60 according to exemplary embodiments of the present disclosure has a structure integrally injection molded on the inner wall surface of the second cap unit 50 which corresponds to the membrane module 10. The bypass tube 60 includes a first tube 61 and a second tube 62.

The first tube 61 has an inlet 63 formed at a lower end thereof, and is disposed in a vertical direction on the inner wall surface of the second cap unit 50 and integrally connected to the inner wall surface of the second cap unit 50. The inlet 63 of the first tube 61 is disposed to be spaced away from a lower surface of the second cap unit 50 inside the second cap unit 50.

Further, the second tube 62 is integrally connected to an upper end of the first tube 61, has an outlet 64 connected with the membrane module 10, and is disposed at the upper end of the first tube 61 to be directed toward the membrane module 10. When the second cap unit 50 is coupled to the membrane module 10, the second tube 62 penetrates the aforementioned support member 13, and connects the interior of the membrane module 10 and the outlet 64.

Here, the air discharge port 51 of the second cap unit 50 may be formed on an upper surface of the second cap unit 50 so as to correspond to the second tube 62 of the bypass tube 60.

Therefore, according to the humidifier 100 for a fuel cell according to exemplary embodiments of the present disclosure, which is configured as described above, since the bypass tube 60 is integrally configured on the inner wall surface of the second cap unit 50, the second tube 62 of the bypass tube 60 may be connected with the interior of the membrane module 10 through the support member 13 when the second cap unit 50 is coupled to the membrane module 10.

Therefore, in exemplary embodiments of the present disclosure, since the interior of the second cap unit 50 and the interior of the membrane module 10 may be bypass-connected through the bypass tube 60, a part of the moisture-containing air, which is introduced into the second cap unit 50 from the membrane module 10, may be bypassed to the membrane module 10 by a pressure difference between the membrane module 10 and the second cap unit 50.

Here, in exemplary embodiments of the present disclosure, the condensate water stagnating in the second cap unit 50 may be bypassed and discharged to the membrane module 10 through the bypass tube 60 by a pressure difference between the membrane module 10 and the second cap unit 50.

That is, because the pressure in the second cap unit 50 is typically higher than the pressure in the membrane module 10, the condensate water captured in the second cap unit 50 may be bypassed and discharged to the membrane module 10 through the bypass tube 60 by a pressure difference between the membrane module 10 and the second cap unit 50.

Specifically, the condensate water stagnating in the second cap unit 50 may be introduced through the inlet 63 of the first tube 61, may be bypassed and discharged into the membrane module 10 through the outlet 64 of the second tube 62, and may be discharged through the discharge air outlet portion 17 of the membrane module 10.

As described above, according to the humidifier 100 for a fuel cell according to exemplary embodiments of the present disclosure, since the condensate water introduced into the second cap unit 50 is bypassed to the membrane module 10 through the bypass tube 60, it is possible to prevent the condensate water from stagnating in the humidifier and to prevent the condensate water from flowing into the fuel cell stack.

Therefore, according to exemplary embodiments of the present disclosure, it is possible to prevent the cell from being withdrawn due to the flow of the condensate water into the fuel cell stack, and thus to improve operational stability of the fuel cell system.

Furthermore, in exemplary embodiments of the present disclosure, since the bypass tube 60 is configured integrally on the inner wall surface of the second cap unit 50 by injection molding, the membrane module 10 and the second cap unit 50 may be bypass-connected through the bypass tube 60 only by fastening the membrane module 10 and the second cap unit 50 when the second cap unit 50 is assembled to the membrane module 10, and as a result, it is possible to achieve convenience when assembling the humidifier.

Figure 3A:
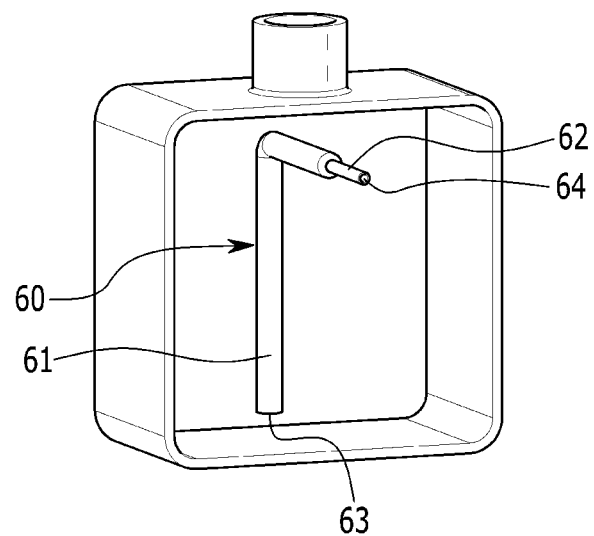
FIGS. 3a and 3b are views illustrating a first modified example of a bypass tube applied to a humidifier for a fuel cell according to exemplary embodiments of the present disclosure.
Figure 3B:
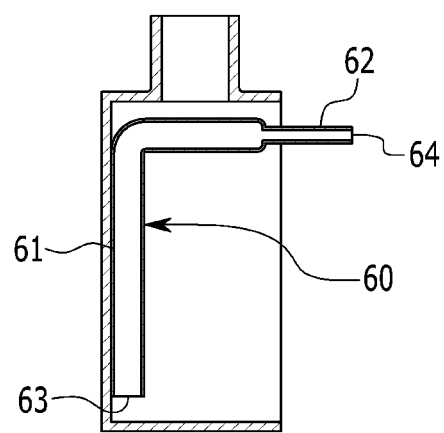

Meanwhile, as a first modified example, the bypass tube 60 according to exemplary embodiments of the present disclosure may be provided such that a cross-sectional area of the inlet 63 of the first tube 61 is relatively larger than a cross-sectional area of the outlet 64 of the second tube 62 as illustrated in FIGS. 3a and 3b. Such a configuration may prevent the condensate water from being frozen and to prevent the inlet 63 of the first tube 61 from being clogged in winter.

Figure 4:
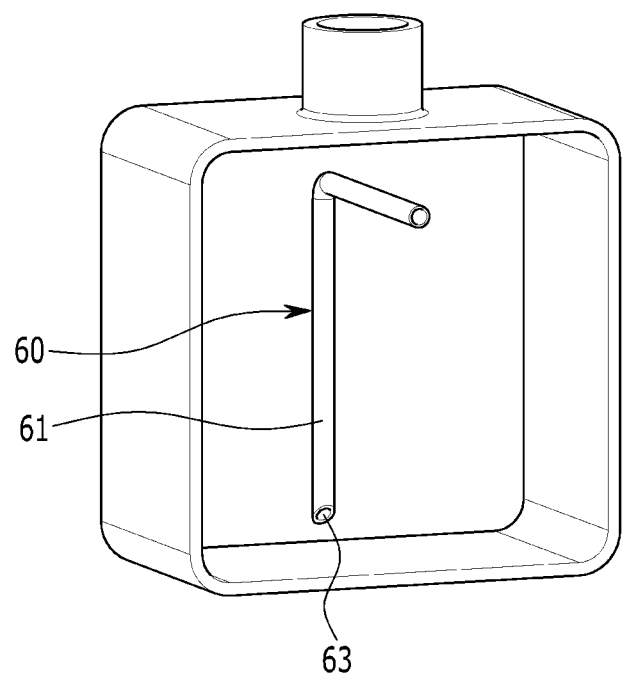
FIG. 4 is a view illustrating a second modified example of a bypass tube applied to a humidifier for a fuel cell according to exemplary embodiments of the present disclosure.

In addition, as a second modified example, the bypass tube 60 according to exemplary embodiments of the present disclosure may have a structure in which a cross section of the inlet 63 of the first tube 61 is diagonally formed toward the membrane module 10 (see FIG. 1) as illustrated in FIG. 4. Such a configuration may increase the inflow amount of the condensate water through the inlet 63 of the first tube 61.

Figure 5:
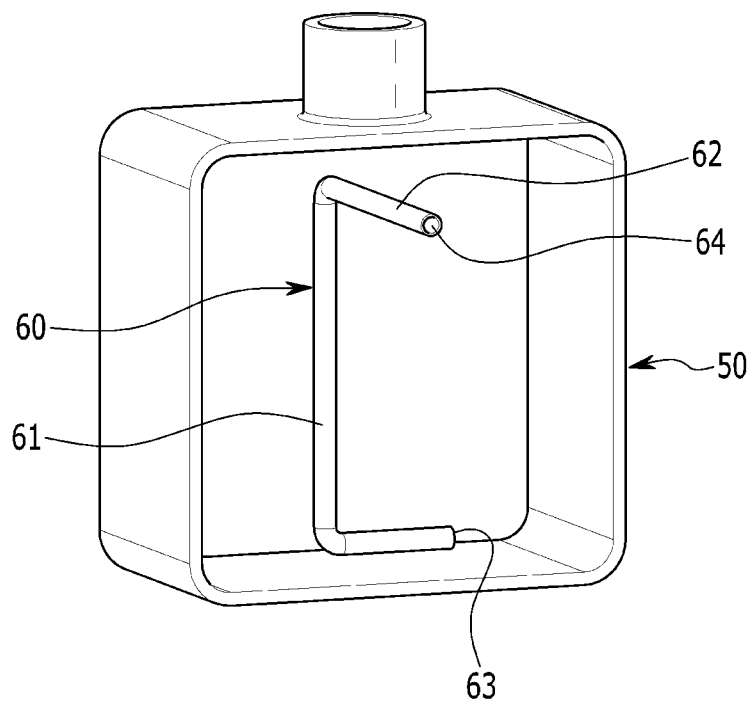
FIG. 5 is a view illustrating a third modified example of a bypass tube applied to a humidifier for a fuel cell according to exemplary embodiments of the present disclosure.

Further, as a third modified example, the bypass tube 60 according to exemplary embodiments of the present disclosure may have a structure in which the inlet 63 of the first tube 61 is disposed in a direction different from an air flow direction in the second cap unit 50 as illustrated in FIG. 5.

Here, the air flow direction in the second cap unit 50 may be defined as a direction toward the inner wall surface of the second cap unit 50 in the membrane module 10 (see FIG. 1). Further, a direction different from the air flow direction may be defined as a direction toward one side surface from the inner wall surface of the second cap unit 50.

To this end, the first tube 61 of the bypass tube 60 according to the third modified example is disposed to extend on the inner wall surface of the second cap unit 50 from the vertical direction to the horizontal direction, and is integrally connected to the inner wall surface of the second cap unit 50.

Here, the inlet 63 of the first tube 61 is disposed at a lower side in the second cap unit 50 in a direction different from the air flow direction, and disposed toward one side surface on the inner wall surface of the second cap unit 50.

Further, the second tube 62 of the bypass tube 60 is integrally connected to the upper end of the first tube 61, has the outlet 64 connected with the membrane module 10 (see FIG. 1), and is disposed on the upper end of the first tube 61 so as to be directed toward the membrane module 10 (see FIG. 1).

The reason why the direction of the inlet 63 of the first tube 61 is set to be different from the air flow direction as described above is to minimize the amount of air bypassed through the bypass tube 60 and to bypass and discharge the condensate water from the second cap unit 50 to the membrane module 10 (see FIG. 1).

Figure 6:
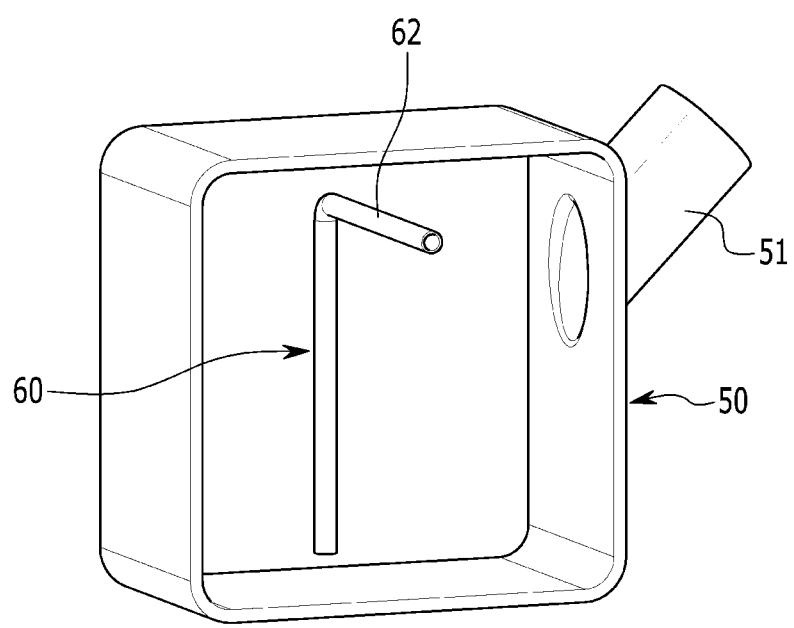
FIGS. 6 and 7 are views illustrating a fourth modified example of a bypass tube applied to a humidifier for a fuel cell according to exemplary embodiments of the present disclosure.
Figure 7:
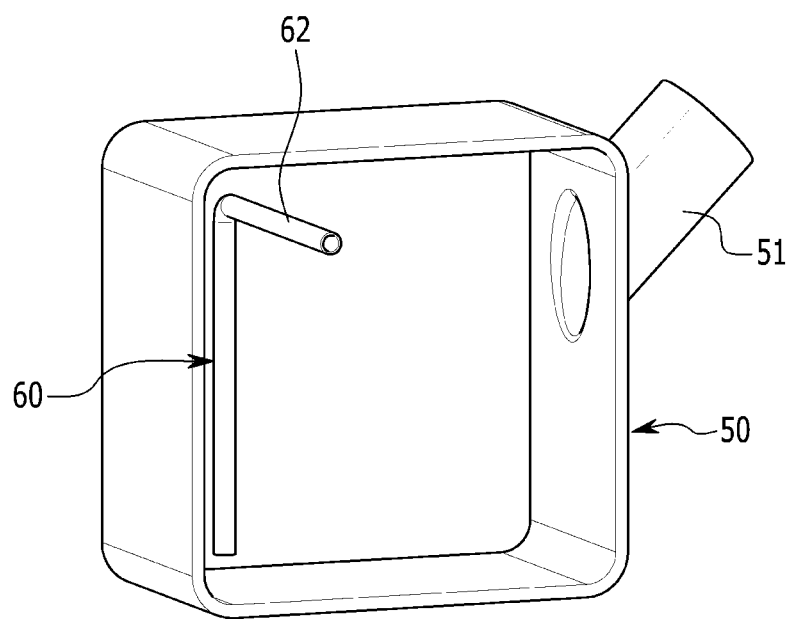

In addition, as a fourth modified example, the bypass tube 60 according to exemplary embodiments of the present disclosure may be configured integrally with the inner wall surface at a position far away from the air discharge port 51 of the second cap unit 50 as illustrated in FIGS. 6 and 7.

Therefore, the air discharge port 51 of the second cap unit 50 is formed at one side of the second cap unit 50 so as to correspond to the second tube 62 of the bypass tube 60. For example, the bypass tube 60 may be provided integrally with the inner wall surface at the other side of the second cap unit 50 (see FIG. 7).

The reason why the position of the bypass tube 60 is set to be the position away from the air discharge port 51 of the second cap unit 50 as described above is to minimize the amount of air bypassed through the bypass tube 60 and to bypass and discharge the condensate water from the second cap unit 50 to the membrane module 10 (see FIG. 1).

Figure 8:
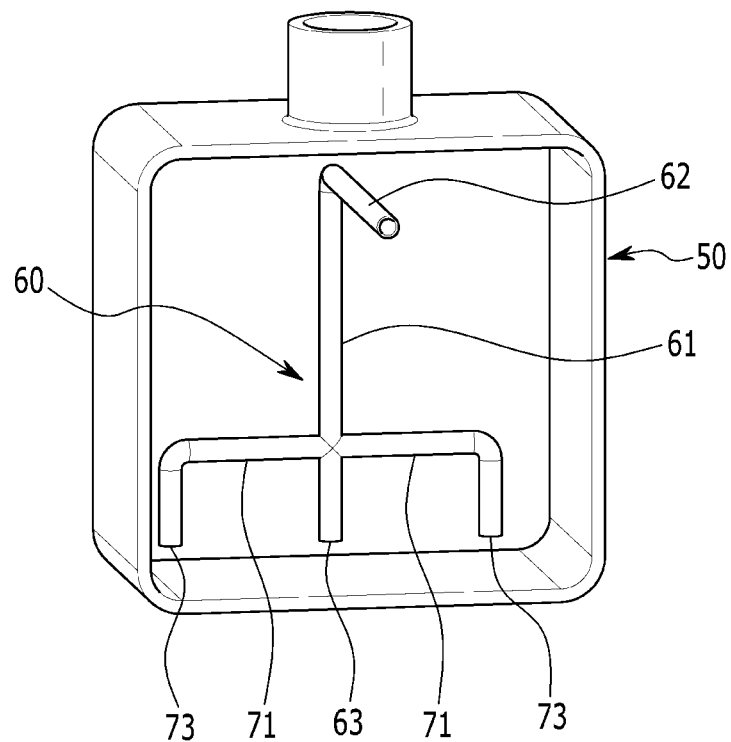
FIG. 8 is a view illustrating a fifth modified example of a bypass tube applied to a humidifier for a fuel cell according to exemplary embodiments of the present disclosure.

Further, as a fifth modified example, as illustrated in FIG. 8, the bypass tube 60 according to exemplary embodiments of the present disclosure basically has the first and second tubes 61 and 62 as illustrated in FIGS. 1 and 2, and further includes at least one third tube 71.

The third tube 71 branches off from the first tube 61 in the horizontal direction, extends in the vertical direction from the direction in which the third tube 71 branches off, has another inlet 73 formed at a lower end thereof, and is integrally connected to the inner wall surface of the second cap unit 50.

In this case, the third tubes 71 branch off at both sides from the first tube 61 in the horizontal direction, and are disposed to extend in the vertical direction from the direction in which the third tubes 71 branch off. Therefore, in some embodiments, the condensate water in the second cap unit 50 may be introduced through the inlet 63 of the first tube 61 and the inlet 73 of the third tube 71, and as a result, it is possible to increase the inflow amount of the condensate water through the inlets 63 and 73.

Figure 9:
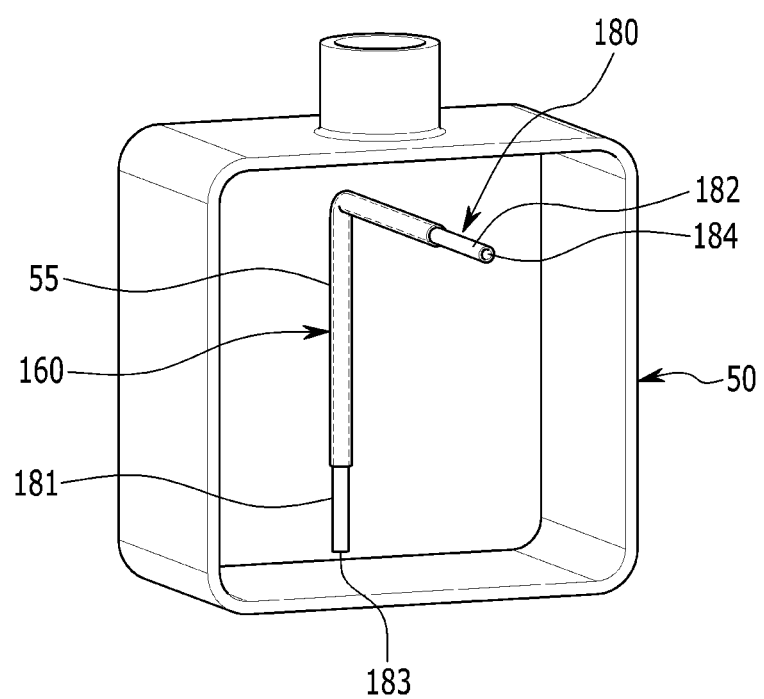
FIGS. 9 and 10 are views illustrating a sixth modified example of a bypass tube applied to a humidifier for a fuel cell according to exemplary embodiments of the present disclosure.
Figure 10:
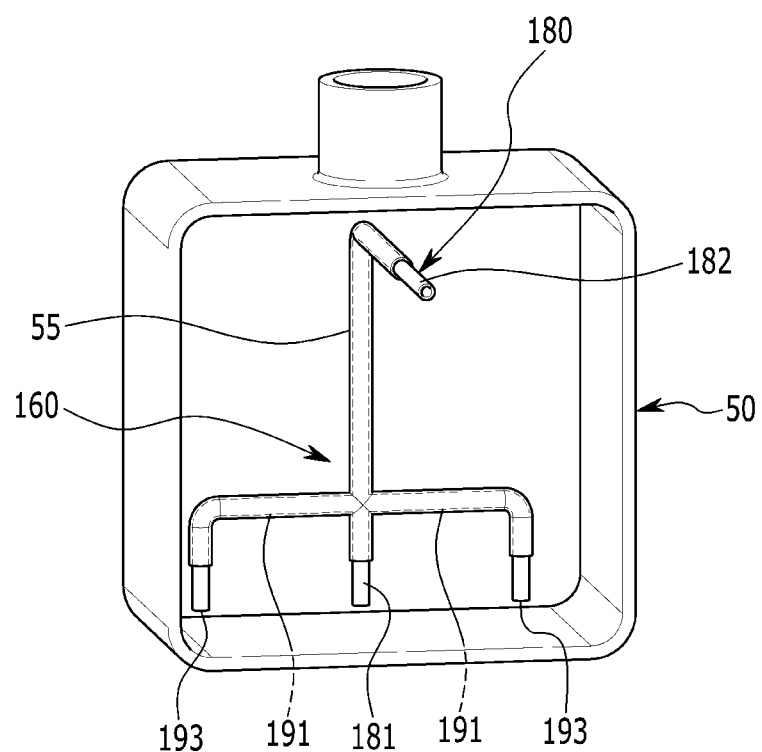

In addition, as a sixth modified example, a bypass tube 160 according to exemplary embodiments of the present disclosure includes metal pipes 180 formed, by insert injection molding, on the inner wall surface of the second cap unit 50 which corresponds to the membrane module 10 (see FIG. 1) as illustrated in FIGS. 9 and 10.

The reason why the metal pipe 180 is formed on the inner wall surface of the second cap unit 50 by insert injection molding as described above is to increase durability of the bypass tube 160 against the second cap unit 50. Here, the metal pipe 180 may be fixed to a fixing member 55 integrally formed on the inner wall surface of the second cap unit 50.

Specifically, the metal pipe 180 includes, in some implementations, a first tube 181 and a second tube 182 as illustrated in FIG. 9. The first tube 181 has an inlet 183 formed at a lower end thereof, and is fixed to the fixing member 55 in the vertical direction. Further, the second tube 182 is integrally connected to the upper end of the first tube 181, has an outlet 184 connected with the membrane module 10 (see FIG. 1), and is fixed to the fixing member 55 so as to be directed toward the membrane module 10 (see FIG. 1).

Furthermore, as illustrated in FIG. 10, the metal pipe 180 includes the first and second tubes 181 and 182 illustrated in FIG. 9, and further includes at least one third tube 191.

The third tube 191 branches off from the first tube 181 in the horizontal direction, extends in the vertical direction from the direction in which the third tube 191 branches off, and is fixed to the fixing member 55, thereby having another inlet 193 formed at a lower end thereof. In this case, the third tubes 191 branch off at both sides from the first tube 181 in the horizontal direction, and are disposed to extend in the vertical direction from the direction in which the third tubes 191 branch off.

Figure 11:
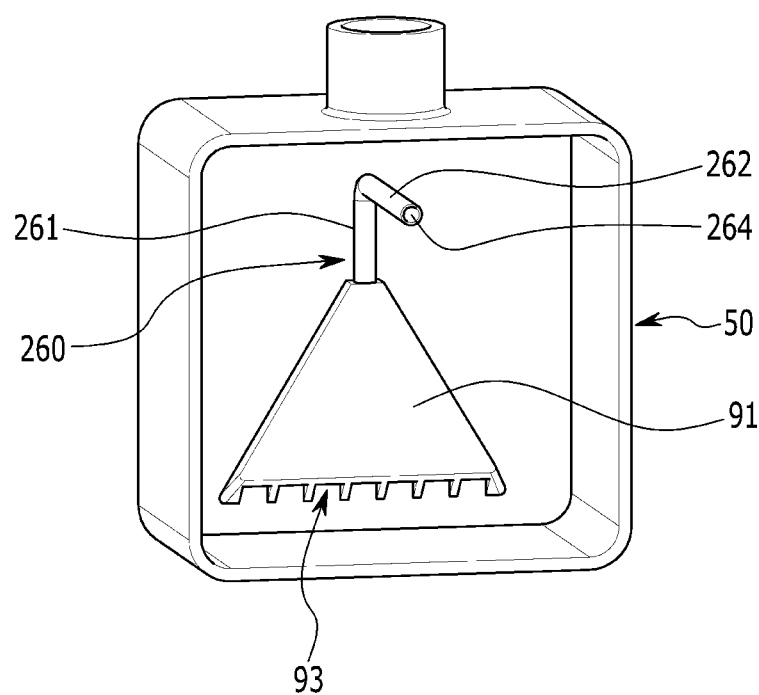
FIG. 11 is a view illustrating a seventh modified example of a bypass tube applied to a humidifier for a fuel cell according to exemplary embodiments of the present disclosure.

Further, as a seventh modified example, the bypass tube 260 according to exemplary embodiments of the present disclosure may be configured to be connected to a duct unit 91 integrally formed on the inner wall surface of the second cap unit 50 which corresponds to the membrane module 10 (see FIG. 1) as illustrated in FIG. 11.

Here, the duct unit 91 has a plurality of inlets 93 formed at a lower end thereof, and is provided as a duct flow path having a shape of which the width is gradually decreased upward.

In the present modified embodiment, the bypass tube 260 includes a first tube 261 connected with the duct unit 91, and a second tube 262 connected with the first tube 261. The first tube 261 is disposed on the inner wall surface of the second cap unit 50 in the vertical direction, connected with an upper portion of the duct unit 91, and integrally formed on the inner wall surface of the second cap unit 50. Further, the second tube 262 is integrally connected to an upper end of the first tube 261, has an outlet 264 connected with the membrane module 10 (see FIG. 1), and is disposed on the upper end of the first tube 261 so as to be directed toward the membrane module 10 (see FIG. 1).

Therefore, in the present modified example, the condensate water stagnating in the second cap unit 50 may be introduced through the duct unit 91, and may be bypassed to the membrane module 10 (see FIG. 1) through the bypass tube 260.

In the present modified example, since the bypass tube 260 is connected to the duct unit 91 of the second cap unit 50 as described above, it is possible to further increase the inflow amount of the condensate water through the inlet 93 of the duct unit 91.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A humidifier for a fuel cell, the humidifier comprising:
 a membrane module which accommodates therein a humidifying membrane;
 a first cap unit coupled to one side of the membrane module and supplying supply air to the membrane module;
 a second cap unit coupled to another side of the membrane module and discharging humidified air introduced from the membrane module; and
 a bypass tube provided in the second cap unit and bypassing condensate water introduced into the second cap unit to the membrane module,
 wherein the bypass tube bypasses moisture, which is introduced into the second cap unit from the membrane module, to the membrane module by a pressure difference between the membrane module and the second cap unit.

2. The humidifier of claim 1, wherein:
 the membrane module includes support members which support both the one end and the other end of the humidifying membrane, and
 the bypass tube is provided in the second cap unit, and bypass-connects an interior of the second cap unit and an interior of the membrane module through the support member.

3. A humidifier for a fuel cell, the humidifier comprising:
 a membrane module which accommodates therein a humidifying membrane;
 a first cap unit coupled to one side of the membrane module and supplying supply air to the membrane module;
 a second cap unit coupled to another side of the membrane module and discharging humidified air introduced from the membrane module; and
 a bypass tube provided integrally on an inner wall surface of the second cap unit, and bypass-connecting the second cap unit and the membrane module,
 wherein the bypass tube bypasses moisture, which is introduced into the second cap unit from the membrane module, to the membrane module by a pressure difference between the membrane module and the second cap unit.

4. The humidifier of claim 3, wherein:
 the bypass tube is integrally injection molded on the inner wall surface of the second cap unit which corresponds to the membrane module.

5. The humidifier of claim 4, wherein the bypass tube includes:
 a first tube which has an inlet formed at a lower end thereof, is disposed on the inner wall surface of the second cap unit in a vertical direction, and is integrally connected to the inner wall surface of the second cap unit; and
 a second tube which is integrally connected to an upper end of the first tube, has an outlet connected with the membrane module, and is disposed on the upper end of the first tube so as to be directed toward the membrane module.

6. The humidifier of claim 5, wherein:
 the bypass tube includes at least one third tube which branches off from the first tube in a horizontal direction, extends in the vertical direction from the direction in which the third tube branches off, has another inlet formed at a lower end thereof, and is integrally connected to the inner wall surface of the second cap unit.

7. The humidifier of claim 3, wherein:
 the bypass tube includes a metal pipe which is formed by insert injection molding on the inner wall surface of the second cap unit which corresponds to the membrane module.

8. The humidifier of claim 7, wherein:
 the metal pipe is fixed to a fixing member integrally formed on the inner wall surface of the second cap unit, and includes a first tube which has an inlet formed at a lower end thereof and is fixed to the fixing member in the vertical direction, and a second tube integrally connected to an upper end of the first tube, has an outlet connected with the membrane module, and is fixed to the fixing member so as to be directed toward the membrane module.

9. The humidifier of claim 8, wherein:
 the metal pipe includes at least one third tube which branches off from the first tube in the horizontal direction, is fixed to the fixing member so as to extend in the vertical direction from the direction in which the third tube branches off, and has another inlet formed at a lower end thereof.

10. The humidifier of claim 5, wherein:
 the bypass tube is provided such that a cross-sectional area of the inlet of the first tube is larger than a cross-sectional area of the outlet of the second tube.

11. The humidifier of claim 5, wherein:
 the bypass tube is provided such that a cross section of the inlet of the first tube is diagonally formed toward the membrane module.

12. The humidifier of claim 3, wherein:
 the second cap unit has an air discharge port through which the humidified air introduced from the membrane module is discharged to a stack, and
 the air discharge port is formed in an upper surface of the second cap unit so as to correspond to the second tube.

13. The humidifier of claim 3, wherein:
 the second cap unit has an air discharge port through which the humidified air introduced from the membrane module is discharged to a stack, and the air discharge port is formed in a side surface of the second cap unit so as to correspond to the second tube.

14. The humidifier of claim 13, wherein:
the bypass tube is provided integrally on the inner wall surface at the other side of the second cap unit.

15. The humidifier of claim 5, wherein:
the inlet of the first tube is disposed in a direction different from an air flow direction in the second cap unit.

16. The humidifier of claim 4, wherein:
the bypass tube includes a first tube disposed on the inner wall surface of the second cap unit so as to extend from the vertical direction to the horizontal direction, has an inlet formed in a direction different from an air flow direction in the second cap unit, and is integrally connected to the inner wall surface of the second cap unit; and
a second tube integrally connected to an upper end of the first tube, has an outlet connected with the membrane module, and is disposed on the upper end of the first tube so as to be directed toward the membrane module.

17. The humidifier of claim 4, wherein:
the second cap unit includes a duct unit integrally formed on the inner wall surface which corresponds to the membrane module, has a plurality of inlets formed at a lower end thereof, gradually decreases in width upward, and is connected with the bypass tube.

18. The humidifier of claim 17, wherein:
the bypass tube includes a first tube disposed on the inner wall surface of the second cap unit in the vertical direction, is connected with an upper portion of the duct unit, and is integrally formed on the inner wall surface of the second cap unit; and
a second tube integrally connected to an upper end of the first tube, has an outlet connected with the membrane module, and is disposed on the upper end of the first tube so as to be directed toward the membrane module.

19. The humidifier of claim 3, wherein:
the membrane module includes support members which support both ends of the humidifying membrane, and
the bypass tube bypass-connects an interior of the second cap unit and an interior of the membrane module through the support member when the second cap unit is assembled to the membrane module.

* * * * *